United States Patent [19]

Sih

[11] 3,773,622
[45] Nov. 20, 1973

[54] METHOD FOR PREPARING 2-SUBSTITUTED-4-HYDROXY-CYCLOPENTANE-1,3-DIONES

[75] Inventor: Charles J. Sih, Madison, Wis.

[73] Assignee: Wisconsin Alumni Research Foundation, Madison, Wis.

[22] Filed: Sept. 29, 1972

[21] Appl. No.: 293,457

[52] U.S. Cl............... 195/51 R, 195/30, 195/103.5
[51] Int. Cl............................................ C12d 13/00
[58] Field of Search............................ 195/51 R, 29

[56] References Cited
UNITED STATES PATENTS
3,432,393   3/1969   Bellet et al........................ 195/51 R Primary Examiner—Alvin E. Tanenholtz
Attorney—Howard W. Bremer

[57] ABSTRACT

A method for preparing optically active 2-substituted-4-hydroxy-cyclopentane-1,3-diones by subjecting 2-substituted cyclopentane-1,3,4-trione or 2-substituted-3-alkoxy-2-cyclopentene-1,4-dione to the fermentative enzymatic action of microorganisms of the orders Endomycetales, Mucorales, Moliliales and Eurotiales.

11 Claims, No Drawings

METHOD FOR PREPARING 2-SUBSTITUTED-4-HYDROXY-CYCLOPENTANE-1,3-DIONES

The invention described herein was made in the course of work under a grant or award from the Department of Health, Education, and Welfare.

This invention relates to a method for preparing certain compounds which are important intermediates in the preparation of prostaglandins.

More specifically, this invention relates to a process for preparing 2-substituted-4-hydroxy-cyclopentane-1,3-diones.

Still more specifically, this invention relates to process for preparing 2-substituted-4-hydroxy-cyclopentane-1,3-diones which comprises subjecting 2-substituted cyclopentane-1,3,4-triones or 2-substituted-3-alkoxy-2-cyclopentene-1,4-diones to the fermentative enzymatic action of certain microorganisms to yield the desired optically-active compounds.

The prostaglandins, which are cyclic, oxygenated $C_{20}$ fatty acids based upon the prostanoic acid skeleton, have received a great deal of attention because of the widespread physiologic responses which they elicit, the cardiovascular, nervous, reproductive, renal and gastric systems of animals, including man, all showing response to the administration of these compounds.

The supply of prostaglandins is currently quite limited and methods for their preparation involve long and tedious steps and produce only minute quantities of the compounds. A further disadvantage with presently known methods for obtaining prostaglandins is the frequent resolution procedures which must be carried out to obtain the desired optically active compounds.

It is a principal purpose of this invention to provide a process for preparing important intermediates for the synthesis of prostaglandins which intermediates are characterized by the desired optical activity.

Broadly, this invention relates to a process for preparing 2-substituted-4-hydroxy-cyclopentane-1,3-diones by subjecting compounds of the formulae:

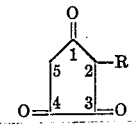

where R is hydrogen or $(CH_2)_x COOR'$, x being an integer from 2 to 8 or

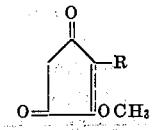

where R is hydrogen or

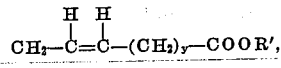

$y$ being an integer from 3 to 5 and R' in each case representing the hydrocarbon portion of an aliphatic, aromatic or heterocyclic alcohol molecule, to the fermentative enzymatic action of a microorganism of the class Ascomycetes. Microorganisms of the orders Endomycetales, Mucorales, Moliliales and Eurotiales of this class are particularly suitable in the method of this invention.

It will be obvious to those skilled in the art that the substituent designated as R in the above cyclopentane systems can vary widely. It can be a saturated or unsaturated or a substituted or unsubstituted ester and can be aliphatic, cyclic or aromatic in nature or any mixture thereof so long as they are hydrogenated by microorganisms. Also, the free acids can themselves be used although it has been found that when esters are used higher yields are obtained. The preferred compounds are those in the 1,3,4-trione system where $x$ is 6 and R' is a saturated hydrocarbon chain containing from 1 to 6 carbon atoms.

Some microorganisms are characterized by the presence of esterase activity which can cause the partial hydrolysis of the ester group at R. This activity can, however, be readily inhibited by the addition of a small quantity of allyl alcohol to the fermentation medium.

That the keto function in the 4-position on the above compounds can be reduced by hydrogenation over Pd/c is known. However, the resulting hydroxy compound is racemic. In contrast, by employing the fermentative action of a microorganism in accordance with the process of the present invention, the hydrogenation of the oxo-function at the 4-position can be accomplished stereospecifically to yield the 4(R) epimeric configuration. This configuration is required for the conversion into the natural prostaglandins. An example of such conversion where the prostaglandin obtained is $PGE_1$ is shown schematically below.

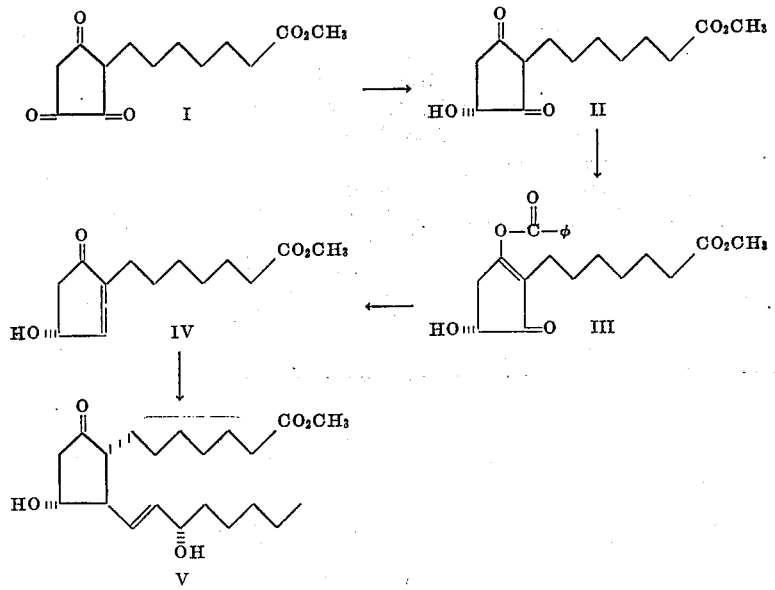

In the above scheme the conversion from I to II is carried out in accordance with the process of this application. II can then be converted into III as follows:

To a cooled (−11° C.), stirred solution of 102.4 mg. (0.4 mmoles) of hydroxydione methyl ester (II) and 0.112 ml. (ca 0.84 mmoles) of triethylamine (distilled over calcium hydroxide) in 8 ml. dry tetrahydrofuran (under $N_2$), was added 0.046 ml. (0.4 mmoles) of benzoyl chloride over a period of 5 minutes. The resulting solution was stirred at −10° C. for 35 minutes. 4 ml. of methanol was added and the solution allowed to warm to room temperature and then poured into 60 ml. of water. This solution was extracted four times with ethyl acetate (50 ml. per extraction) and the combined extract was washed successively with 10 ml. of 0.1N HCl, 10 ml. of water, 10 ml. of saturated sodium bicarbonate and 10 ml. of saturated sodium chloride and dried over magnesium sulfate. III was recovered by evaporating the solvent.

The conversion from III to IV was readily accomplished as follows:

To a cooled (−78° C.), stirred solution of 50 mg. (0.147 moles) of III in 10 ml. of dry tetrahydrofuran under $N_2$ sodium dihydro-bis(2-methoxy ethoxy) aluminate ($Na[AlH_2(OCH_2CH_2OCH_3)_2]$) in toluene (1.5M) was added in four 0.38 ml. aliquots over a 15 minute period. The resulting solution was stirred at −78° C. for a further 30 minutes. Two ml. of glacial acetic acid was then added, the solution was allowed to warm to room temperature and was poured into 40 ml. of water. The resulting mixture was extracted with four 30 ml. aliquots of ethyl acetate. The ethyl acetate layer was separated, washed successively with 10 ml. of saturated sodium bicarbonate solution and 10 ml. saturated sodium chloride solution and dried over $MgSO_4$. The solvent (ethyl acetate) was then evaporated and the resultant oil was dissolved in 10 ml. of acetic acid-water (75:25) solution. The resulting solution was stirred at room temperature for 24 hours and the acetic-water was evaporated under reduced pressure. The resulting oil was dissolved in 10 ml. of ethyl acetate, washed successively with saturated sodium bicarbonate and saturated sodium chloride solutions and dried over $M_gSO_4$. IV was recovered by evaporating the solvent.

The conversion from IV to V can be carried out in accordance with the process of Charles J. Sih et al., J. Amer. Chem. Soc., 94, 3643, May 17, 1972. Thus, once the stereospecific 2(6′-carbomethoxyhexyl)-4(R)-hydroxy-cyclopentane-1,3-dione is obtained the conversion to the prostaglandin can be readily accomplished with retention of the desired stereospecificity.

In the following Examples the stereochemistry of the 4-hydroxyl function was established by circular dichroism analysis. The R epimer exhibits a negative cotton effect, $([\theta] \times 10^{-3} - 85°)$ at λ281 nm and a positive cotton effect $([\theta] \times 10^{-3} + 87°$ at λ262 nm, characteristic of this type of system. Also, the stereochemistry was correlated with that of prostaglandin $E_1$ ($PGE_1$) by converting the 2(6′-carbomethoxyhexyl)-4(R)-hydroxy-cyclopentane-1,3-dione into $PGE_1$ in accordance with the procedure described above.

It has been observed that there are variations in the efficiency with which different orders, genera and species of microorganisms in the class Ascomycetes accomplish the process of reduction of this invention, i.e. reduction of the oxo function at C-4 as hereinbefore described. The relative efficiency of a given organism to accomplish such reduction can be readily ascertained from the screening procedure which is outlined below.

General Screening Procedure to Determine Efficiency of any Specific Organism

Inoculate the microorganism onto Sabouraud's agar slants or other agar base media suitable for growth. Place the inoculated slants in an incubator maintained at 25° C. and allow to grow for 1 week. Remove the slant and add 15 ml. of sterile distilled water to it. Loosen the spores and vegetative growth from the agar with a sterile needle. Transfer the suspension to a flask containing 50 ml. of the soy-dextrose medium described below and place the flask in a rotary shaker in an incubator maintained at 25 C. at 210 r.p.m. for 24 hours. After this initial time period (first stage seed), add 5 ml. of the submerged growth to each of duplicate flasks of three types of media, namely, soy-dextrose, cerelose Edamine and dextrin-cornsteep, the compositions of which are given below. Place the flasks in the shaker and allow to grow from about 24 to 48 hours at 25 C. Add to one flask of each pair 25 mg. of any substrate 2-substituted-cyclopentane-1,3,4-trione in 0.25 ml. of dimethylformamide. Add to the other flask of each pair 0.25 ml. of dimethylformamide to serve as the control. Agitate all of the flasks under the same conditions for an additional 24 hours and remove from the shaker. Note the growth characteristics and pH and then acidify the whole beer of each flask with 6N HCl to pH 2.0 and extract once with a volume of ethyl acetate equal to the volume of beer. Remove the solvent of each extract by warming in a water bath at about 60° C. Dissolve each residue in 1 ml. of acetone for application to thin-layer plate for chromatographic analysis.

The screening samples are then all chromatographed on silica gel G plates using a suitable system, a preferred one being ethyl acetate-acetic acid-isooctane-$H_2$) (110:20:50:100). After development, the plates are viewed under ultraviolet light. The following Rf values were observed for the compounds of interest.

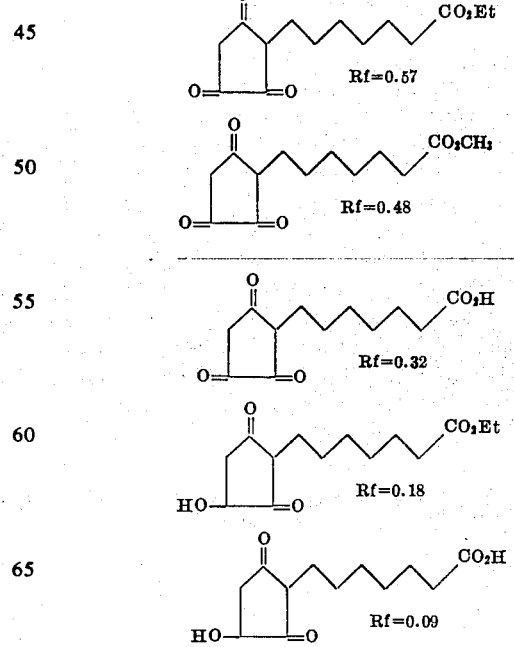

Constitution of illustrative nutrient media suitable for the above screening procedure and for the batch fermentations given below in the examples are as follows:

Soy-dextrose

| | |
|---|---|
| Soybean meat | 5 g. |
| Dextrose | 20 g. |
| NaCl | 5 g. |
| K₂HPO₄ | 5 g. |
| Yeast | 5 g. |
| Water | 1 l. |
| pH adjusted to 7.0 | |
| Autoclave at 15 psi for 15 minutes | |

Cerelose-Edamine

| | |
|---|---|
| Cerelose (crude dextrose) | 50 g. |
| Edamine* | 20 g. |
| Cornsteep liquor | 5 ml. |
| Water | 1 l. |
| pH adjusted to 7.0 | |

*An enzymatic hydrolysate of milk protein obtainable from Sheffield Farms Co.

Dextrin-Cornsteep

| | |
|---|---|
| Dextrin | 10 g. |
| Cornsteep liquor | 80 g. |
| KH₂PO₄ | 1 g. |
| NaCl | 5 g. |
| Water | 1 l. |
| pH adjusted to 7.0 | |
| Autoclave at 15 psi for 30 minutes | |

The above general screening procedure and nutrient media, as well as the fermentations in the Examples below are illustrative only and can be varied in different ways. Thus, other microorganisms which effect the redution process of this invention than those specifically recited can be used; sources of nitrogen and carbon in the nutrient media other than those specified above may also be employed. (For example, corn meal, oat meal, meat extract or other protein hydrolysates can be used or sucrose, glucose, maltose, starch, molasses, etc., can be substituted for the dextrin). Also, other modifications familiar in the fermentation art may be employed — the time of addition of the substrate after addition of the medium can be varied; the initial pH for addition and conversion of the substrate can be varied from about 5.0 to about 7.5; the quantity of substrate and the stirring rate can be varied.

Products produced in accordance with the following Examples were identified as to structure through the use of ultraviolet, infrared, and nuclear magnetic resonance spectra, and by thin-layer chromatographic mobilities.

EXAMPLE 1

2(6'-carbomethoxyhexyl)-4(R)-hydroxy-cyclopentane-1,3-dione (II) was prepared as follows:

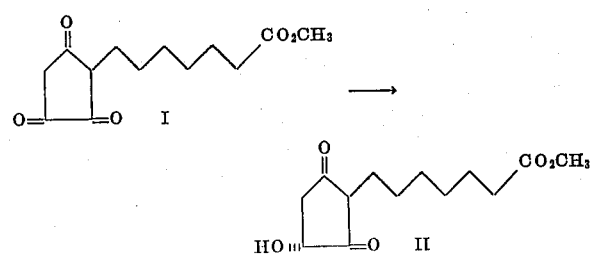

A. FERMENTATION

The surface growth from a one week old agar slant of Dipodascus uninucleatus was suspended in 5 ml. of saline (0.85%) solution. Two ml. portions of this suspension were used to inoculate 50 ml. of the soybean-dextrose medium above held in 250 ml. Erlenmeyer flasks (F-1 stage). The flasks were incubated at 25° C. on a rotary shaker (250 cycles/min. - 2 inch radius) for 24 hours, after which a 10% by volume transfer was made to each of four 2 liter Erlenmeyer flasks (F-2 stage), containing 500 ml. of the soybean dextrose medium. After 24 hours of incubation on a rotary shaker, 250 mg. of 2(6'-carbmethoxyhexyl)-cyclopentane-1,3,4-trione (I) (J. Katsube and M. Matsui, *J. Agr. Biol. Chem.*, 33, (Japan) 1078, 1969), dissolved in 2 ml. of dimethylformamide was added to each flask. The F-2 stage flasks were then incubated for an additional 24 hours under the condition used in the incubation of the F-1 stage flasks.

B. ISOLATION

Twenty-four hours after the addition of the 2-carbomethoxyhexyl-cyclopentane-1,3,4-trione (I), the cells were removed by centrifugation. The supernatant was adjusted to pH 2.0 with 6N HCl, and was exhaustively extracted with 1.5 liters of ethyl acetate three times. The ethyl acetate was dried over Na₂SO₄ and evaporated to afford an oily residue. This residue was dissolved in 0.5 ml. of benzene-ethyl acetate (1:1) and added onto a column (32 × 2.5 cm.) of silicic acid-Celite (85:15). The column was eluted with a gradient system consisting of 500 ml. of 50% ethyl acetate-benzene in the mixing chamber and 500 ml. of pure ethyl acetate in the reservoir, and 7 ml. fractions were collected. Fractions 25-104 containing the desired product were pooled and concentrated to dryness yielding 1.2 g. of crystalline residue. Recrystallization from ethyl acetate-petroleum ether afforded 750 mg. of 2-carbomethoxyhexyl-4(R)-hydroxy-cyclopentane-1,3-dione (II), m.;. 90°-92° C.; $[\alpha]_D^{23}= +19.93°(C_1 \; 102 \; CHcl_3)$; $\lambda_{max}^{alc} 272 \; m\mu(\epsilon 23,500)$; CD ($[\theta]\times 10^{-3} = -85°$ at $\lambda 281$ nm and $[\theta] \times 10^{-3} = +87°$ at $\lambda 262$ nm).

EXAMPLES 2 THROUGH 67

The procedure of Example 1 was repeated with each of the organisms listed in the following Table. (All of the organisms listed are on deposit and may be obtained from Northern Regional Research Laboratory at Peoria, Illinois.) In all cases conversion to the desired product, 2-carbomethoxy-hexyl-4(R)-hydroxy-cyclopentane-1,3-dione, was obtained in good yield.

| Example | Organism Order—Endomycetales |
|---|---|
| 2 | Byssoclamys fulva |
| 3 | Dipodascus uninucleatus |
| 4 | Dipodascus aggregatus |
| 5 | Dipodascus alibidus |
| 6 | Zygosaccharomyces priorianus |
| 7 | Zygosaccharomyces ashbya |
| 8 | Saccharomyces cerevisiae |
| 9 | Saccharomyces cerevisiae var. odessa |
| 10 | Saccharomyces cerevisiae fragilis |
| 11 | Saccharomyces cerevisiae acidifaciens |
| 12 | Saccharomyces cerevisiae lactis |
| 13 | Saccharomyces cerevisiae dobzanskii |
| 14 | Endomycopsis fibuliger |
| 15 | Endomycopsis javaanesis |
| 16 | Hansenula anomala |
| 17 | Schizosaccharomyces pombe |

| | |
|---|---|
| 18 | *Schizosaccharomyces octosporum* |
| | Order—Mucorales |
| 19 | *Absidia blakesleeana* |
| 20 | *Absidia regnieri* |
| 21 | *Mucor rammannianus* |
| 22 | *Zygorhynchus heterogamus* (+) |
| 23 | *Phascolomyces articulosus* |
| 24 | *Phycomyces blakesleeanus* |
| | Order—Moliliales |
| 25 | *Rhodotorula aurantiaca* |
| 26 | *Rhodotorula pallida* |
| 27 | *Geotrichum candidum* |
| 28 | *Torulopsis pulcherrima* |
| 29 | *Candida krusei* |
| 30 | *Gliocladium fimbriatum* |
| 31 | *Gliocladium vermoeseni* |
| 32 | *Paecilomyces varioti* |
| 33 | *Stachybotrys lobulata* |
| 34 | *Trichoderma viride* |
| 35 | *Memnoniella echinata* |
| 36 | *Gliocladium roseum* |
| 37 | *Fusarium decemcellulare* |
| 38 | *Alternaria tenuis* |
| 39 | *Gliocladium catenulatum* |
| | Order—Eurotiales |
| 40 | *Penicillium striatum* |
| 41 | *P. claviforme* |
| 42 | *P. pseudostromaticum* |
| 43 | *P. roqueforti* |
| 44 | *P. caseicolum* |
| 45 | *P. expansum* |
| 46 | *P. purpurogenum* |
| 47 | *P. varioti* |
| 48 | *P. frequentans* |
| 49 | *P. duclauxi* |
| 50 | *P. multicolor* |
| 51 | *P. sclerotiorum* |
| 52 | *P. granulatum* |
| 53 | *P. vermiculatum* |
| 54 | *P. terlikowskii* |
| 55 | *P. italicum* |
| 56 | *Aspergillus ustus* |
| 57 | *A. restrictus* |
| 58 | *A. ungins* |
| 59 | *A. terreus* |
| 60 | *A. luchensis* |
| 61 | *A. clavatus* |
| 62 | *A. ornatus* |
| 63 | *A. miyakoensis* |
| 64 | *A. citrisporus* |
| 65 | *A. janua* |
| 66 | *Dactylomyces thermophilus* |
| 67 | *Thielavia sependonium* |

EXAMPLE 68

2-(6'-carbomethoxyhexyl-4(R)-hydroxy-cyclopentane-1,3-dione was prepared in accordance with the procedure of Example 1 except that 2-(6'-carbomethoxyhexyl)-3-methoxy-2-cyclopentene-1,4-dione was used as the substrate for conversion into the desired product.

EXAMPLE 69

2-(6'-carboethoxyhexyl)-4(R)-hydroxy-cyclopentane-1,3-dione (IV) was prepared as follows:

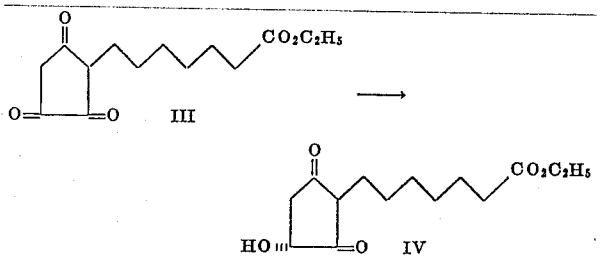

A. FERMENTATION

The surface growth from a one week old agar slant of *Schizosaccharomyces pombe* (CBS 352) was suspended in 5 ml. of saline (0.85%) solution. Two ml. portions of this suspension were used to inoculate 50 ml. of the soybean-dextrose medium above held in 250 ml. Erlenmeyer flasks (F-1 stage). The flasks were inoculated at 25° C. on a rotary shaker (250 cycles/min. — 2 inch radius) for 24 hours, after which a 10% by volume transfer was made to one 2 liter Erlenmeyer flask (F-2 stage) containing 500 ml. of the soybean-dextrose medium. After 24 hours of incubation on a rotary shaker, 250 mg. of 2-(6'-carboethoxyhexyl)-cyclopentane-1,3,4-trione (III) (J. Katsube and M. Matsui, *J. Agr. Biol. Chem*, 33, (Japan) 1078, 1969) dissolved in 2 ml. of dimethylformamide was added to the flask. The F-2 stage flask was then incubated for an additional 24 hours under the conditions used in the incubation of the F-1 stage flasks.

B. ISOLATION

Twenty-four hours after the addition of the trione substrate (III) the yeast cells were removed by centrifugation. The supernatant was adjusted to pH 2.0 with 6N HCl and was exhaustively extracted with 500 ml. of ethyl acetate three times. The ethyl acetate layer was dried over $Na_2SO_4$ and evaporated to yield an oily residue. The residue was dissolved in 2 ml. of benzene-ethyl acetate (1:1) and added onto a column (2.5 × 25 cm.) of silicic acid-Celite (85:15). The column was eluted with a gradient system consisting of 300 ml. of ethyl acetate-benzene (1:1) mixture and 300 ml. of ethyl acetate in the reservoir, and 7 ml. fractions were collected. Fractions 19–31 were pooled and concentrated affording 39 mg. of IV, m.p. 83°–83° C. $[\alpha]_D^{23} + 14°$ ($C_1$ 0.47, $CHCl_3$); $\lambda_{max}^{alc}$ 272 m$\mu$ ($\epsilon$20,000).

The processes of this invention produce the desired optically active 2-substituted-4-hydroxy-cyclopentane-1,3-diones in high yield with 70–80% conversions being common. It will be obvious that variations in the proportions and amounts of reactants can favorably or unfavorably affect the yield of the desired products and it is to be understood that such proportions and reactant amounts which are specified in the foregoing Examples are not to be considered critical to obtaining the desired products.

Having thus described the invention what is claimed is:

1. A method for preparing optically active 2-substituted-4-hydroxy-cyclopentane-1,3-diones which comprises subjecting 2-substituted-cyclopentane-1,3,4-trione or 2-substituted-3-alkoxy-2-cyclopentane-1,4-dione to the fermentative enzymatic action of a microorganism of the class Ascomycetes and recovering the desired compound from the reaction mixture.

2. The method of claim 1 wherein the microorganism is selected from the orders Endomycetales, Mucorales, Moliliales or Eurotiales.

3. A method for preparing optically active 2-substituted-4(R)-hydroxy-cyclopentane-1,3-diones which comprises subjecting compound having the formula

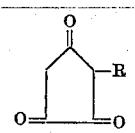

where R is hydrogen or $(CH_2)_xCOOR'$, x being an integer from
2 to 8
or

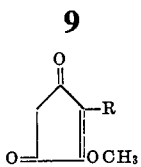

where R is hydrogen or

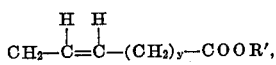

*y* being an integer from 3 to 5 and
R' in each case representing the hydrocarbon portion of an aliphatic, aromatic or heterocyclic alcohol molecule to the fermentative enzyme action of a microorganism of the orders Endomycetales, Mucorales, Moliliales and Eurotiales and recovering the optically active diones from the reaction mixture.

4. The method of claim 1 wherein the 2-substituted-cyclopentane-1,3,4-trione is 2(6'-carbomethoxyhexyl)-cyclopentane-1,3,4-trione.

5. The method of claim 1 wherein the 2-substituted-3-alkoxy-2-cyclopentene-1,4-dione is 2(6'-carbomethoxyhexyl)-3-methoxy-2-cyclopentene-1,4-dione.

6. The method of claim 1 wherein the 2-substituted-cyclopentane-1,3,4-trione is 2(6'-carboethoxyhexyl)-cyclopentane-1,3,4-trione.

7. The method of claim 4 wherein the microorganism is selected from the order Endomycetales.

8. The method of claim 7 wherein the microorganism is *Dipodascus aggregatus*.

9. The method of claim 7 wherein the microorganism is *Dipodascus albidus*.

10. The method of claim 5 wherein the microorganism is selected from the order Endomycetales.

11. The method of claim 6 wherein the microorganism is selected from the order Endomycetales.

* * * * *